(12) United States Patent
Jones

(10) Patent No.: US 10,864,664 B2
(45) Date of Patent: Dec. 15, 2020

(54) FOAM-IN-BAG DEVICE WITH BAG-STATUS INDICATOR

(75) Inventor: Michael Paul Jones, Tulsa, OK (US)

(73) Assignee: Pregis Intellipack LLC, Deerfield, IL (US)

( * ) Notice: Subject to any disclaimer, the term of this patent is extended or adjusted under 35 U.S.C. 154(b) by 722 days.

(21) Appl. No.: 13/223,086

(22) Filed: Aug. 31, 2011

(65) Prior Publication Data

US 2013/0047551 A1 Feb. 28, 2013

(51) Int. Cl.
*B65B 57/18* (2006.01)
*B65G 57/00* (2006.01)
(Continued)

(52) U.S. Cl.
CPC ............ *B29C 44/182* (2013.01); *B29C 44/60* (2013.01); *B31D 5/0078* (2013.01); *B29K 2275/00* (2013.01); *B29L 2031/7128* (2013.01); *B29L 2031/7138* (2013.01); *B65B 51/146* (2013.01); *B65B 57/00* (2013.01); *B65B 57/02* (2013.01); *B65B 57/08* (2013.01); *B65B 57/18* (2013.01); *B65B 61/04* (2013.01); *Y10T 83/0467* (2015.04); *Y10T 83/152* (2015.04)

(58) Field of Classification Search
CPC ....... B29C 44/82; B29C 44/60; B29C 44/182; B29C 44/18; B29C 44/351; B29K 2275/00; B31D 5/0078; B65B 9/00; B65B 9/06; B65B 57/18; B65B 57/15; B65B 57/145; B65B 57/005; B65B 57/08; B65B 51/146; B65B 57/00; B65B 57/02; B65B 61/04; B65B 61/12; B65B 61/28; B65B 67/00; Y10T 83/141; Y10T 83/145; B67C 3/007

USPC ..... 53/75, 296, 476, 508, 52, 451, 551, 467; 83/27, 75, 361; 425/142; 264/163; 166/73, 4, 202

See application file for complete search history.

(56) References Cited

U.S. PATENT DOCUMENTS 3,839,934 A * 10/1974 Russo ................. B21D 43/021
83/210
4,354,408 A * 10/1982 Carte ....................... B26D 5/26
271/188
(Continued)

FOREIGN PATENT DOCUMENTS

EP 0534457 A2 3/1993
JP 655550 B2 3/1985
(Continued)

OTHER PUBLICATIONS

International Search Report and Written Opinion dated Dec. 20, 2012 for the International Application No. PCT/US2012/052462, filed Aug. 27, 2012.

*Primary Examiner* — Robert F Long
*Assistant Examiner* — Eduardo R Ferrero
(74) *Attorney, Agent, or Firm* — Fox Rothschild LLP

(57) ABSTRACT

Disclosed herein is a foam-in-bag dispensing system, including a dispensing apparatus operative to dispense foam precursor, the foam precursor being configured for expanding and solidifying into a polymeric foam, to a dispensing location between first and second web plies extending respectively on first and second sides of the dispensing apparatus; and a bag-status indicator associated for providing an indication to the operator indicative of the readiness of the bag for removal from the device for avoiding premature bag removal.

30 Claims, 14 Drawing Sheets

(51) Int. Cl.
  B29C 44/18 (2006.01)
  B29C 44/60 (2006.01)
  B31D 5/00 (2017.01)
  B29K 275/00 (2006.01)
  B29L 31/00 (2006.01)
  B65B 57/02 (2006.01)
  B65B 51/14 (2006.01)
  B65B 61/04 (2006.01)
  B65B 57/00 (2006.01)
  B65B 57/08 (2006.01)

(56) References Cited

U.S. PATENT DOCUMENTS

| | | | |
|---|---|---|---|
| 4,506,488 A * | 3/1985 | Matt | B65B 57/00 53/450 |
| 4,563,862 A * | 1/1986 | McElvy | B29C 66/8491 53/552 |
| 4,854,109 A | 8/1989 | Pinarer et al. | |
| 4,938,007 A | 7/1990 | Sperry | |
| 4,951,444 A * | 8/1990 | Epstein | B65B 31/021 53/433 |
| 4,999,975 A * | 3/1991 | Willden | B29C 44/182 53/451 |
| 5,139,151 A | 8/1992 | Chelak | |
| 5,186,905 A | 2/1993 | Bertram et al. | |
| 5,289,671 A * | 3/1994 | Lerner | B65B 57/02 53/479 |
| 5,376,219 A * | 12/1994 | Sperry | B29C 44/182 100/328 |
| 5,465,549 A * | 11/1995 | Lummus | B65B 51/08 53/138.7 |
| 5,575,435 A | 11/1996 | Sperry et al. | |
| 5,679,208 A | 10/1997 | Sperry et al. | |
| 5,699,902 A | 12/1997 | Sperry et al. | |
| 5,727,370 A * | 3/1998 | Sperry | 53/472 |
| 5,791,522 A | 8/1998 | Lee et al. | |
| 5,794,406 A * | 8/1998 | Reichental et al. | 53/410 |
| 5,864,484 A | 1/1999 | Harding | |
| 5,930,983 A * | 8/1999 | Terminella et al. | 53/436 |
| 5,950,875 A | 9/1999 | Lee et al. | |
| 6,003,288 A * | 12/1999 | Sperry | B29C 44/182 53/371.4 |
| 6,131,375 A | 10/2000 | Sperry | |
| 6,178,725 B1 * | 1/2001 | Sperry et al. | 53/451 |
| 6,234,777 B1 * | 5/2001 | Sperry et al. | 425/46 |
| 6,256,968 B1 * | 7/2001 | Kristen | B65B 31/02 53/405 |
| 6,283,174 B1 | 9/2001 | Sperry et al. | |
| 6,289,649 B1 | 9/2001 | Cherfane | |
| 6,386,850 B1 * | 5/2002 | Salerno | B29C 44/16 425/112 |
| 6,675,557 B2 | 1/2004 | Sperry et al. | |
| 6,690,287 B2 * | 2/2004 | Jette | E05F 15/74 340/691.7 |
| 6,719,863 B2 * | 4/2004 | Basque | B29C 65/222 156/290 |
| 6,732,496 B1 * | 5/2004 | Wessman | B29C 65/3656 53/451 |
| 6,792,807 B2 * | 9/2004 | Binder | G01N 29/11 493/207 |
| 6,811,059 B2 | 11/2004 | Piucci, Jr. et al. | |
| 6,820,835 B2 | 11/2004 | Cavaliere et al. | |
| 6,854,246 B2 * | 2/2005 | Savage et al. | 53/449 |
| 6,996,956 B2 | 2/2006 | Sperry et al. | |
| 7,160,096 B2 | 1/2007 | Knaak et al. | |
| 7,211,169 B2 * | 5/2007 | Noble | 156/583.1 |
| 7,213,383 B2 * | 5/2007 | Walker | B29B 7/7678 156/555 |
| 7,299,103 B1 * | 11/2007 | Dye | B29C 44/182 700/108 |
| 7,328,541 B2 | 2/2008 | Garceau et al. | |
| 7,331,542 B2 * | 2/2008 | Cocciadiferro | B65H 19/10 242/578 |
| 7,367,171 B2 | 5/2008 | Bertram et al. | |
| 7,429,304 B2 | 9/2008 | McNamara, Jr. et al. | |
| 7,603,831 B2 | 10/2009 | Sperry et al. | |
| 7,610,113 B2 * | 10/2009 | Cocciadiferro | B29B 7/7663 700/108 |
| 7,735,685 B2 | 6/2010 | Bertram | |
| 8,738,665 B2 * | 5/2014 | Hunter | G06F 3/0481 707/805 |
| 2002/0092272 A1* | 7/2002 | Sperry et al. | 53/455 |
| 2002/0092279 A1* | 7/2002 | Sperry | B29C 65/18 53/568 |
| 2004/0139692 A1* | 7/2004 | Jacobsen | B65B 57/12 53/55 |
| 2004/0255560 A1* | 12/2004 | Noble | B29B 7/7663 53/469 |
| 2005/0022474 A1* | 2/2005 | Albritton | B65B 31/046 53/434 |
| 2006/0219314 A1* | 10/2006 | Bertram | B29C 44/588 141/10 |
| 2007/0113523 A1* | 5/2007 | Baptista | B65B 51/146 53/434 |
| 2008/0169046 A1* | 7/2008 | Bender | B65B 3/003 141/11 |
| 2008/0172986 A1* | 7/2008 | Theurer | G05B 19/188 53/284.7 |
| 2009/0056286 A1* | 3/2009 | Bertram | B29C 44/60 53/505 |
| 2010/0038008 A1 | 2/2010 | Soudan | |
| 2011/0072765 A1* | 3/2011 | Salerno | B29C 44/182 53/562 |
| 2012/0060447 A1* | 3/2012 | Liu | B65B 31/048 53/434 |
| 2012/0111449 A1* | 5/2012 | Hsu | B65B 1/32 141/82 |
| 2012/0181718 A1* | 7/2012 | Sperry et al. | 264/46.5 |
| 2013/0333336 A1* | 12/2013 | Liu | B65B 31/048 53/507 |

FOREIGN PATENT DOCUMENTS

| | | | | |
|---|---|---|---|---|
| JP | | 10505291 A | 5/1998 | |
| JP | | 2001514606 A | 9/2001 | |
| JP | | 2008537706 A | 9/2008 | |
| JP | | 2009149442 A | 7/2009 | |
| JP | | 2009535110 A | 10/2009 | |
| JP | | 2016532587 A | 10/2016 | |
| WO | WO | 2004101252 A2 * | 11/2004 | B29C 44/18 |

* cited by examiner

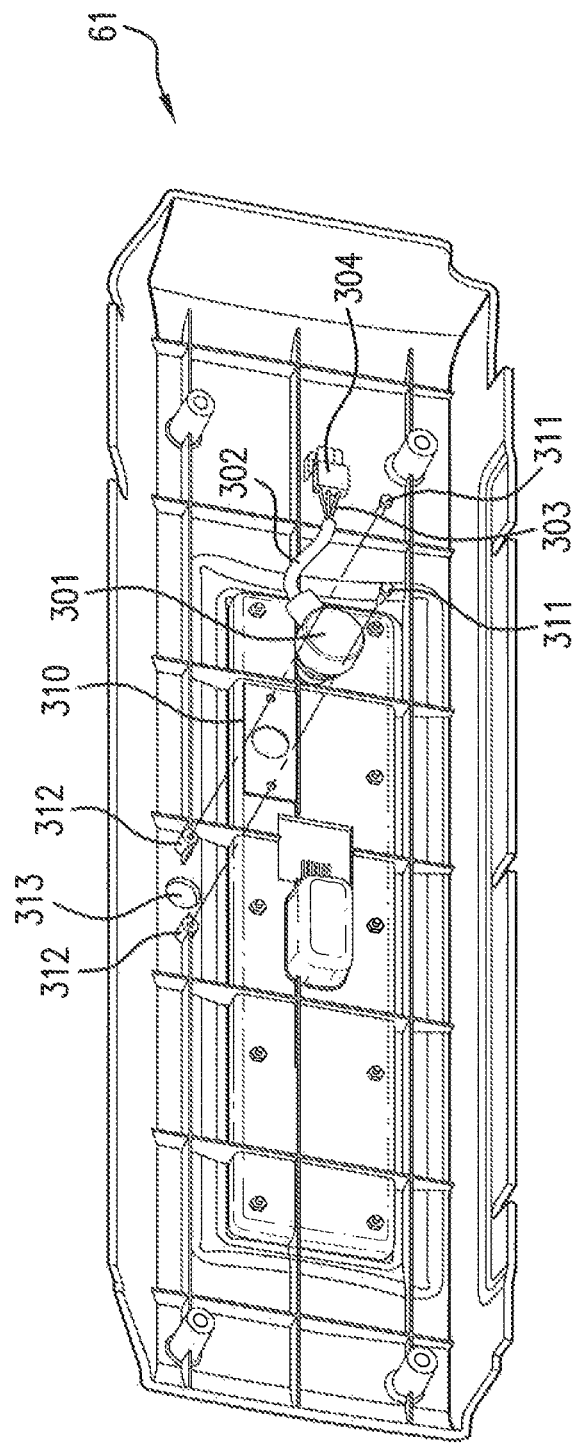

FOAM-IN-BAG DEVICE WITH BAG-STATUS INDICATOR

TECHNICAL FIELD

The present disclosure is directed to a dispensing system and components therefore. In particular, the present disclosure is directed to a foam-in-bag dispensing apparatus used to produce foam-filled bags, and components having application in the foam-in-bag apparatus.

BACKGROUND

Foam material dispensers have been developed including those directed at dispensing polyurethane foam precursor that are mixed together to form a polymeric product. The chemicals are often selected so that they harden following a generation of carbon dioxide and water vapor, and they have been used to form "hardened" (e.g., a cushioning quality in a proper fully expanded state) polymer foams in which the mechanical foaming action is caused by the gaseous carbon dioxide and water vapor leaving the mixture.

In particular techniques, synthetic foams such as polyurethane foam are formed from liquid organic resins and polyisocyanates in a mixing chamber (e.g., a liquid form of isocyanate, which is often referenced in the industry as chemical "A", and a multi-component liquid blend called polyurethane resin, which is often referenced in the industry as chemical "B"). The mixture can be dispensed into a receptacle, such as a package or a foam-in-place bag, where it reacts to form a polyurethane foam.

One particular problem with existing foam-in-bag dispensing apparatus is that, during use, the operator thereof may be prone to remove the bag from the apparatus too early. If a bag is pulled to early, the bag and/or the subsequent bag being filled, may not be properly sealed, or the bag being pulled may not have been fully cut from the film web from which the bag is made. Premature pulling of the bag can slide the film within the sealing and cutting mechanism and cause the sealing and/or cutting to fail or to be made incorrectly. In some cases, the pulled bag and the next bag do not get sealed or separated from each other. In other cases, the bag may be partially sealed and/or cut, and one or both bags can open, resulting in the fluid foam precursors to spill out.

Thus, an improved manner of helping to ensure that bags are not pulled prematurely is needed.

BRIEF SUMMARY OF THE DISCLOSURE

In one embodiment, disclosed herein is a foam-in-bag dispensing system, including a dispensing apparatus operative to dispense foam precursor, the foam precursor being configured for expanding and solidifying into a polymeric foam, to a dispensing location between first and second web plies extending respectively on first and second sides of the dispensing apparatus; and a bag-status indicator associated for providing an indication to the operator indicative of the readiness of the bag for removal from the device for avoiding premature bag removal.

The bag-status indicator is associated with a cutting mechanism for providing an indication to the operator indicative of the completion of the cutting operation. The indicator may be indicative of the cutting operation being sufficiently completed to allow a separation of the bags without pulling the film through the sealing mechanism and ruining the seal. A sealing mechanism may be included to seal the web plies to each other to trap the foam precursor therebetween to form a filled bag, wherein the indicator is indicative of the sealing operation being sufficiently completed to allow a separation of the bags with the bag fully sealed. The indicator may be further indicative of the cutting operation being sufficiently completed to allow a separation of the bags without pulling the film through the sealing mechanism and ruining the seal.

A controller may be included that is operably connected to the indicator and the dispensing apparatus, wherein the controller is configured to send a signal to the indicator indicative of the readiness of the bag for removal. The controller may provide an indication when the bag is ready to be removed. The controller may provide an indication when the bag is not yet ready to be removed.

The bag-status indicator may include a visual indicator. The visual bag-ready indicator may include a light. The visual bag-ready indicator may be positioned on a control panel of the dispensing system. The bag-status indicator includes an audible indicator.

In another embodiment, disclosed herein is a method of providing a foam-in-bag cushion using a foam-in-bag dispensing system, including dispensing a foam precursor, the foam precursor being configured for expanding and solidifying into a polymeric foam, into a dispensing location between first and second web plies extending respectively on first and second sides of the dispensing apparatus; and providing an indication, using a bag-status indicator, to the operator indicative of the readiness of the bag for removal from the device for avoiding premature bag removal.

The method may include operating a cutting mechanism to cut a filled bag formed from the web from a remaining portion of the web, wherein the indication is indicative of the completion of the cutting. The method may include operating a sealing mechanism to seal the web plies to each other to trap the foam precursor therebetween to form the filled bag, wherein the indication is indicative of the cutting operation being sufficiently completed to allow a separation of the bags without pulling the film through the sealing mechanism and ruining the seal on the formed bag or on a subsequent bag. The method may include operating a sealing mechanism to seal the web plies to each other to trap the foam precursor therebetween to form a filled bag, wherein the indication is indicative of the sealing operation being sufficiently completed to allow a separation of the bags without ruining the seal on the formed bag or a subsequent bag. The indication may be further indicative of the cutting operation being sufficiently completed to allow a separation of the bags without pulling the film through the sealing mechanism and ruining the seal.

The method may further include providing a controller that is operably connected to the indicator and the dispensing apparatus and sending a signal from the controller to the indicator to generate the indication depending on the readiness of the bag for removal. The controller may send the signal when the bag is ready to be removed. The controller may send the signal when the bag is not yet ready to be removed.

While multiple embodiments are disclosed, still other embodiments in accordance with the present disclosure will become apparent to those skilled in the art from the following detailed description, which shows and describes illustrative embodiments. As will be realized, the disclosed embodiments are capable of modifications in various aspects, all without departing from the spirit and scope of thereof. Accordingly, the drawings and detailed description are to be regarded as illustrative in nature and not restrictive.

BRIEF DESCRIPTION OF THE FIGURES

While the specification concludes with claims particularly pointing out and distinctly claiming the subject matter that is regarded as forming the various embodiments of the present disclosure, it is believed that the embodiments will be better understood from the accompanying figures, in which:

FIGS. 13a and 13b illustrate the bag-ready indicator of FIGS. 12a and 12b as mounted on a panel display of the dispenser system.

DETAILED DESCRIPTION

With general reference to FIGS. 1-4, the present disclosure is directed to a dispensing system and components therefore. In particular, the present disclosure a foam-in-bag dispensing apparatus 20 used to produce foam-filled bags, and components having application in the foam-in-bag apparatus. Specific aspects of the apparatus 20 are discussed as follows.

Figure 1:
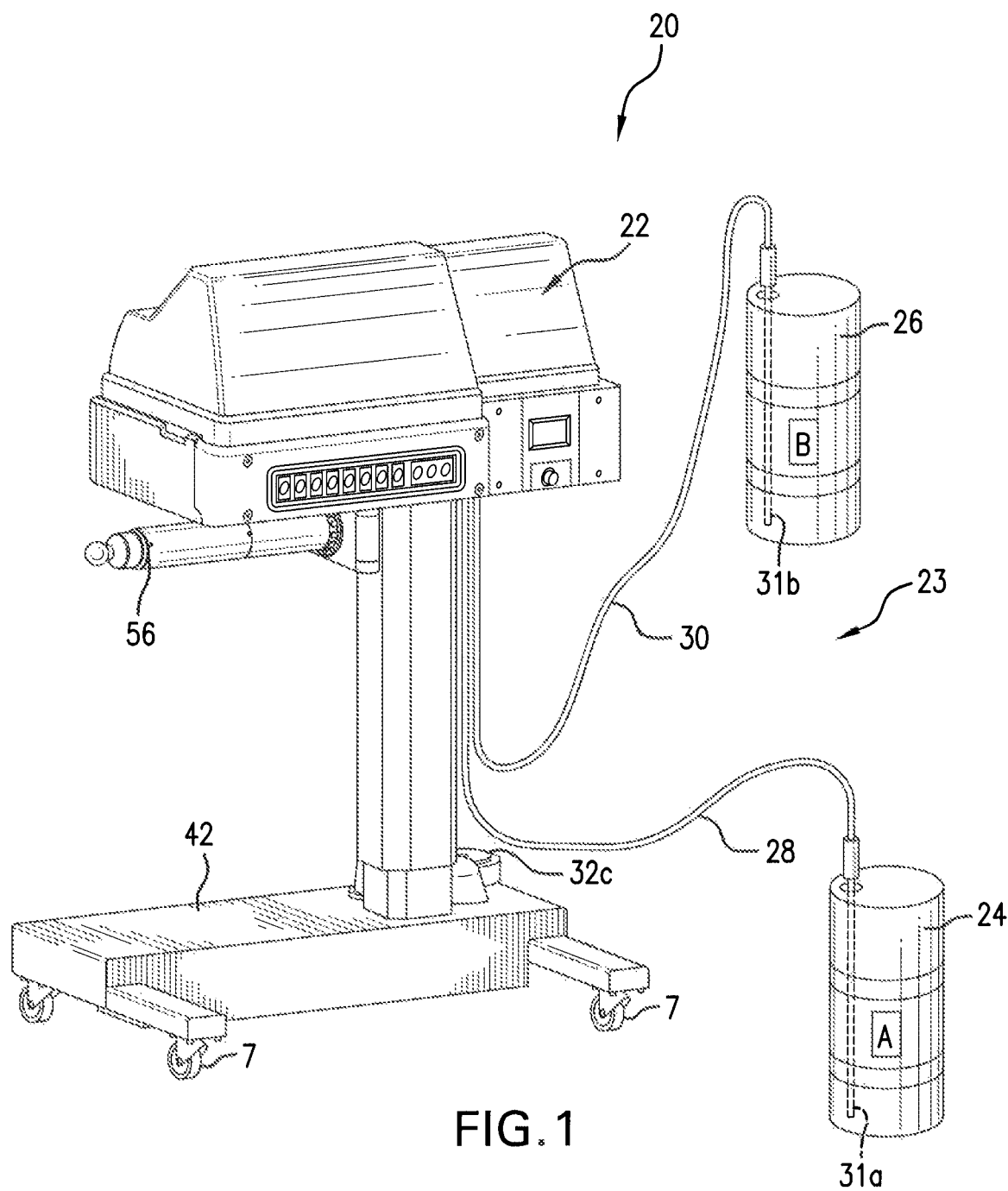
FIG. 1 illustrates an embodiment of the dispensing system of the present disclosure.

FIG. 1 illustrates a preferred embodiment of the dispensing system 20 of the present disclosure, which includes dispenser system 22 in communication with the chemical supply system 23, itself including chemical supply container 24 (supplying chemical component A) and chemical supply container 26 (supplying chemical component B). Chemical hoses 28 (chemical A) and 30 (chemical B), in connection with tubes 31a, 31b (extending into the containers 24,26), provide fluid communication between respective chemical supply containers 24, 26 and in-line pumps 32a, 32b mounted on dispenser system 22 (see FIG. 11). Dispenser system 22 can include in-line pumps 32a, 32b that is in communication with chemical supply containers that are either in proximity (for example, 40 feet or less) to the dispenser system 22 or remote (for example, greater than 40 feet) from where the dispenser system 22 is located. This allows the containers to be situated in a more convenient or less busy area of a plant or other facility wherein the dispensing apparatus 20 is employed, as it is often not practical to store chemicals in close proximity to the dispenser system 22. (for example, 100 to 500 feet separation of dispenser system 22 and chemicals 24, 26 may be desirable in some applications). Thus, it is inherent in the present disclosure that a great deal of versatility as to how the dispenser system is to be set up relative to the chemical source is possible. As a number of installations require that the containers be stored hundreds of feet (for example, 100 to 500 feet or more) away from the system. In another embodiment, where the distance between the containers 24, 26 is shorter, e.g., about 20 feet to about 40 feet, tubes 31a, 31b may be replaced by pumps in containers 24, 26. The pumps 32a, 32b feed chemicals A and B to the system 22 via hoses 28, 30. It will be appreciated that in any embodiment, the chemicals A and B may be fed to the system 22 at its base, at the head, or at any other position of the system 22. The present disclosure is designed to accommodate these long, or short, length installation requirements, as may be present in any particular application.

Figure 3:
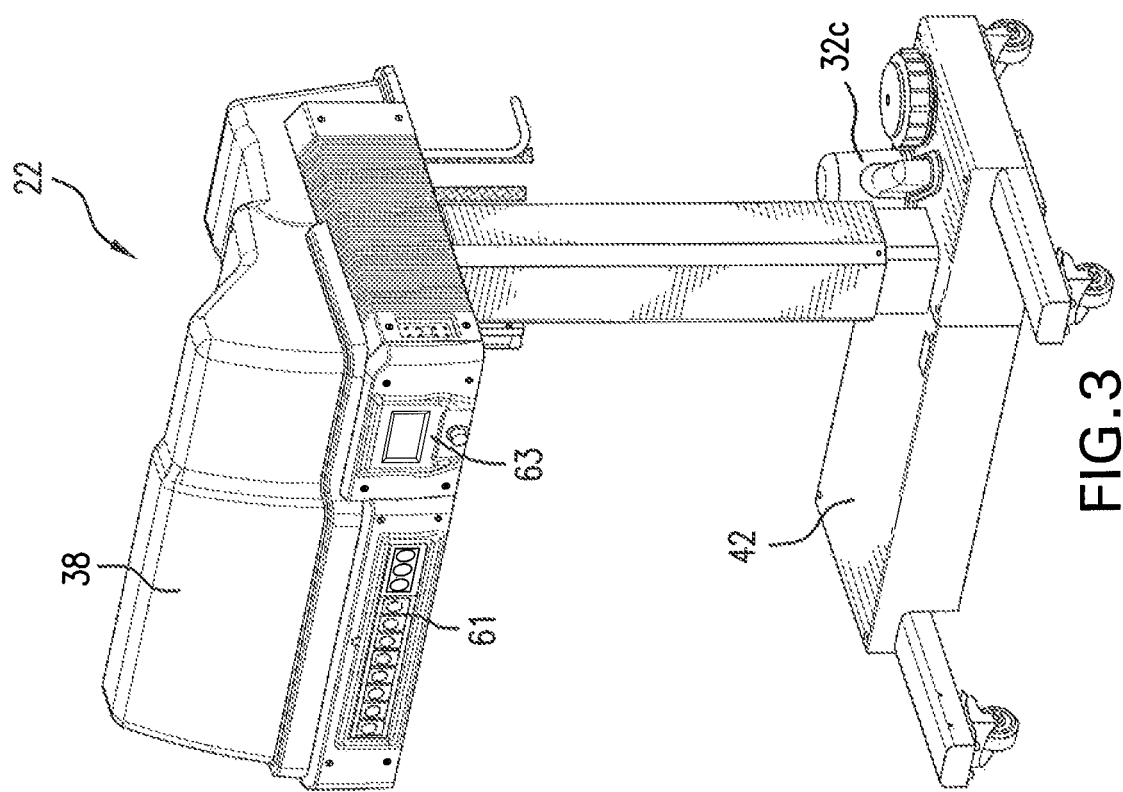
FIGS. 2 and 3 illustrate a rear and front view, respectively of a dispenser system of the dispensing system as in FIG. 1.
Figure 2:
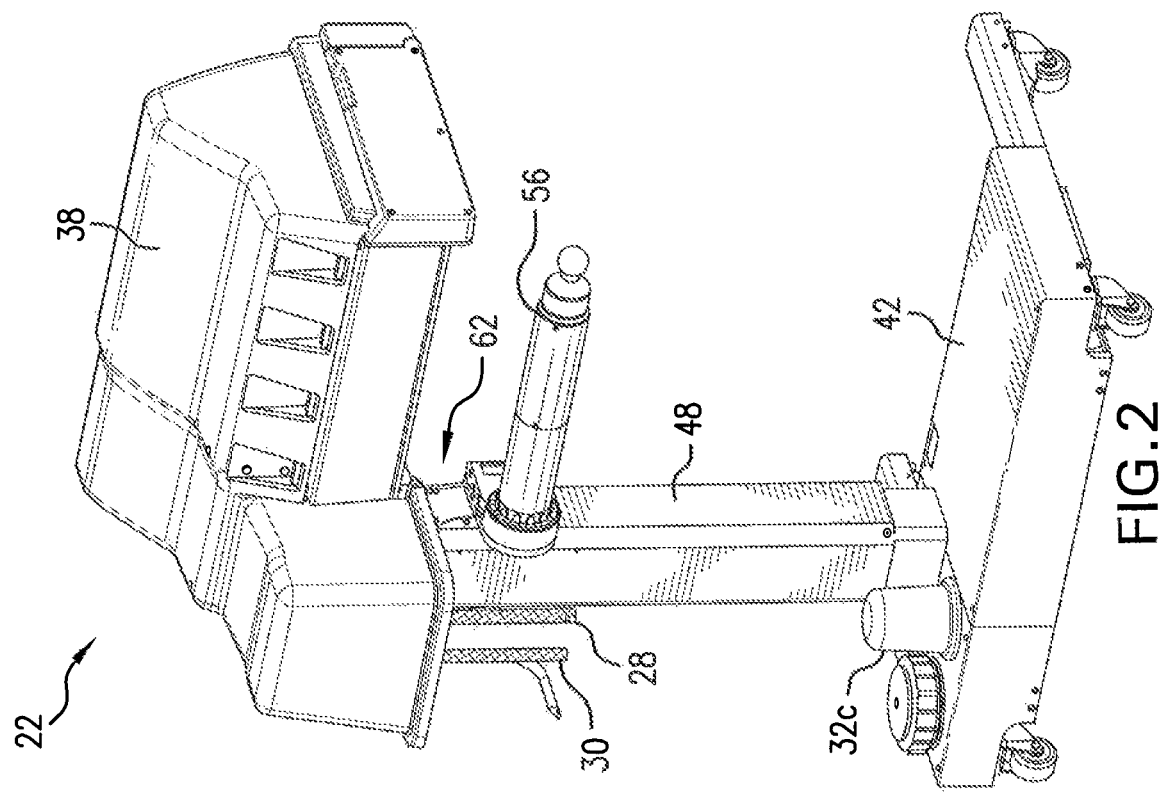

FIGS. 2 and 3 provide rear and front elevational views, respectively, of dispenser system 22 which includes exterior housing 38 supported on telescoping support assembly 40, which in a preferred embodiment includes a lifter (for example, an electric motor driven gear and rack system with inner and outer telescoping sleeves or a screw mechanism) and is mounted on base 42 (for example, a roller platform base to provide some degree of mobility). Further mounted on base 42 is solvent pump system 32c (shown covered) configured to deliver a solvent cleaning solution from a solvent tank, through the assembly 40, and into the chemical dispenser apparatus (discussed in greater detail below) where such solvent is used to clean the tip of the mixing module (also discussed in greater detail below). Film roll reception assembly 56 preferably extends out from support assembly 48. FIG. 3 further provides a view of first and second control panels 61, 63.

Figure 4:
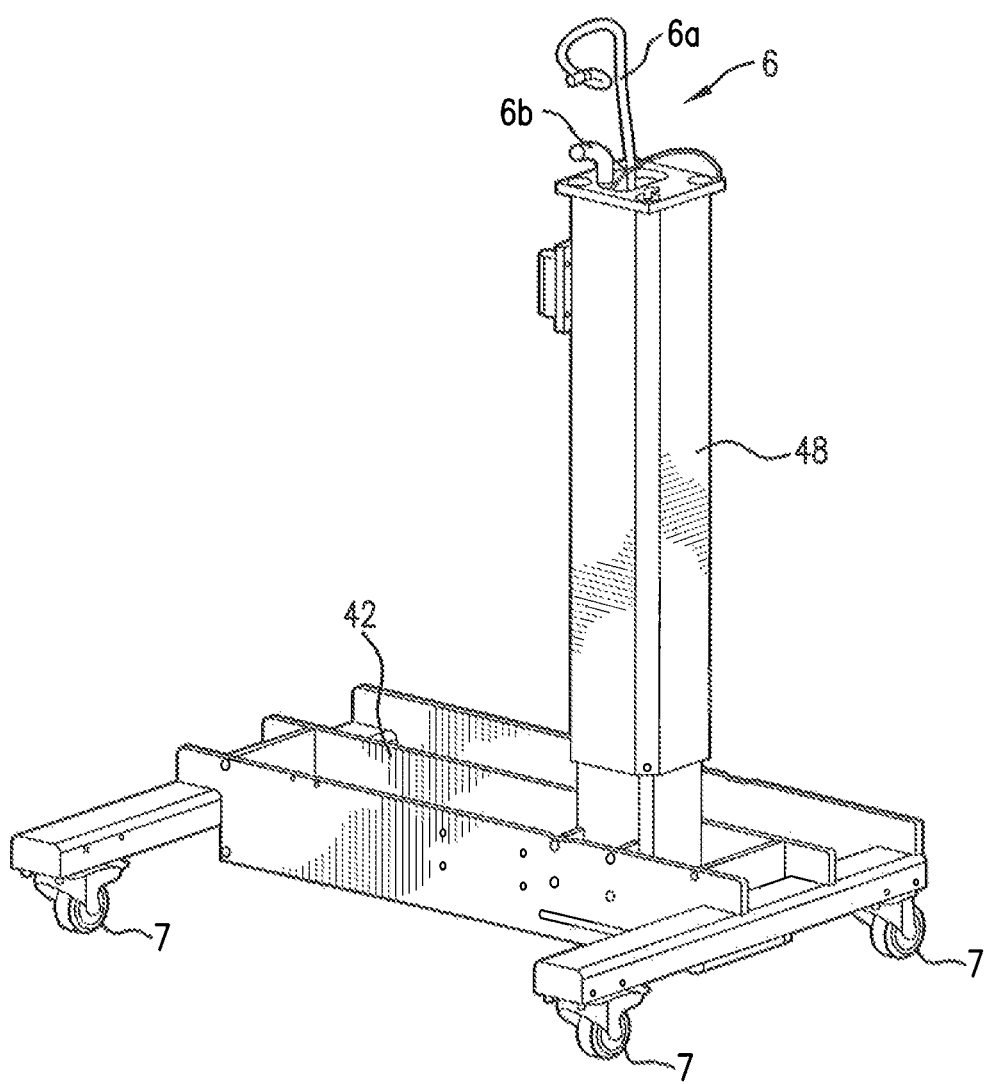
FIG. 4 illustrates a base and extendable support assembly of the dispenser system.

FIG. 4 illustrates base 42 and lifter or extendable support assembly 48 (e.g., preferably a hydraulic (air pressure) or gear/rack combination or some other telescoping or slide lift arrangement or a screw mechanism) extending up from base 42. FIG. 4 also illustrates the mobile nature of base 42 which is a wheeled assembly (wheels 7). Further shown are the connection assembly 6, including a solvent line 6a and electrical connectors 6b.

FIGS. 5-8 generally show aspects of a foam-in-bag assembly or "bagger assembly" of the present embodiment. The assembly includes frame sections 71, 73 which form a unitary flip door frame, and may be made of extruded aluminum. A rod 70 is fixed to the flip door frame sections 71, 73 and pivots in a hole in plate 66. Driver roller shaft 72, supporting left and right driven or follower nip rollers 74, 76. While in a latched state, the upper ends of frame sections 71, 73 are also supported (locked in closed position) by door latch rod 85 with handle latch 87.

Figure 7:
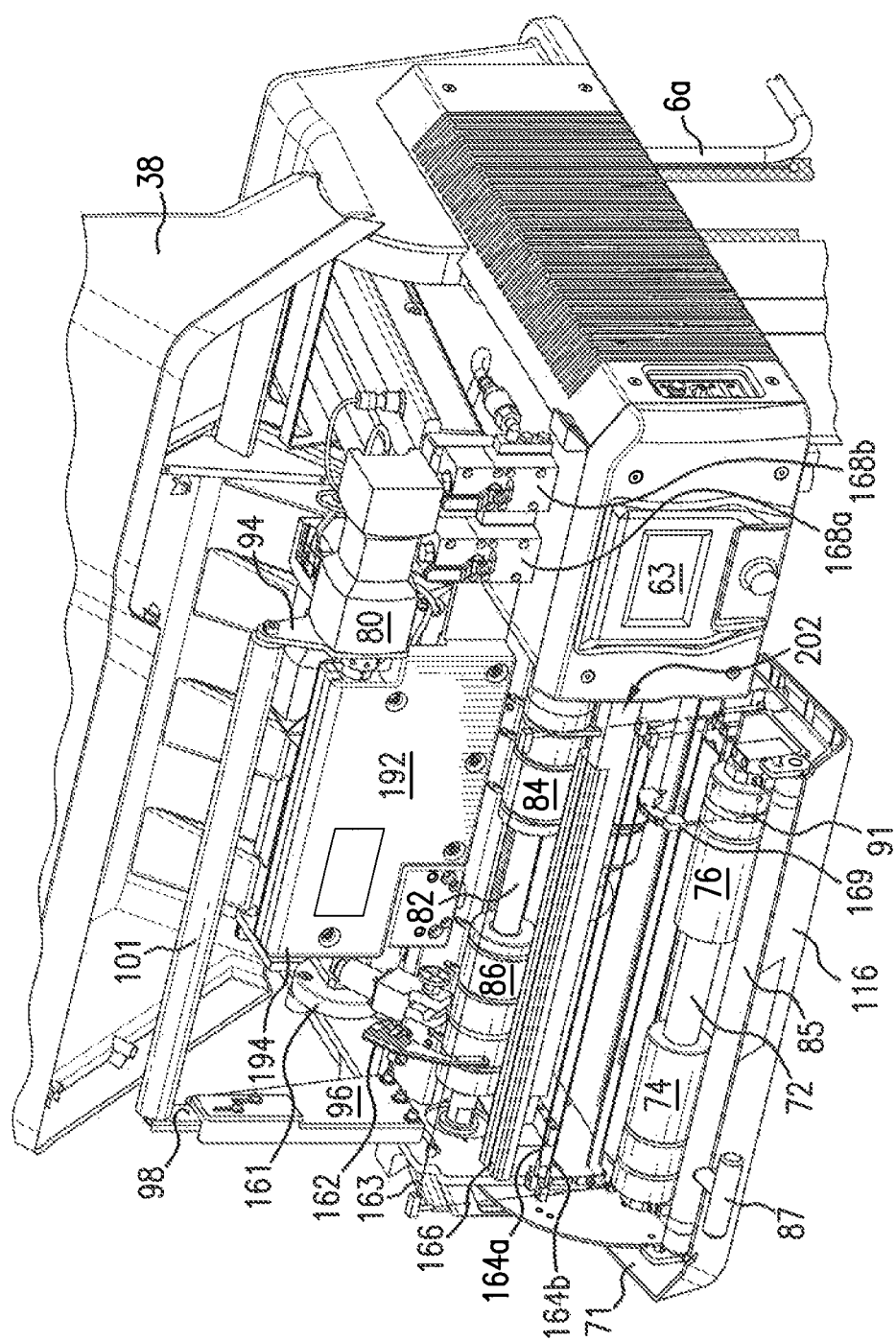

Drive shaft 82 supports drive nip rollers 84, 86. Driven roller shaft 72 and driver roller shaft 82 are in parallel relationship and spaced apart so as to place the driven nip rollers 74, 76, and drive nip rollers 84, 86 in a film drive relationship with a preferred embodiment featuring a motor driven drive roller set 84, 86, driven by motor 80a, formed of a compressible, high friction material such as an elastomeric material (for example, a synthetic rubber) and the opposite, driven roller 74, 76 is preferably formed of a knurled aluminum nip roller set (although alternate arrangement are also featured as in both sets being formed of a compressible material like rubber). In some embodiments, shaft 72 and rollers 74, 76 may be of unitary construction, Drive nip rollers 84, 86 have slots formed for receiving film wrapping preventing means 90 (for example, canes 90). For example, canes 90 may be employed to prevent the film web from wrapping around the nip rollers 84, 86. FIG. 7 further illustrates bag film edge sealer 169 shown received within a slot 91 in roller 76 and positioned to provide edge sealing to a preferred C-fold film supply. Support portions 94 and 96 extend upward from the nip roller contact location. Support portion 94 supports the dispenser apparatus 92. Support portion 96 includes an upper portion 98 that includes a means for receiving an end of upper idler roller 101. The other end of the idler roller 101 is supported by support portion 100.

Idler roller 101 can preferably be adjusted to accommodate any roller assembly position deviation that can lead to non-proper tracking and also can be used to avoid wrinkled or non-smooth bag film contact. Also, idler roller 101 is preferably a steel or metal roller and not a plastic roller to avoid static charge build up relative to the preferred plastic film supplied. Idler roller is also preferably of the type having roller bearings positioned at its ends (not shown) for smooth performance and smooth, unwrinkled film feed.

Figure 5:
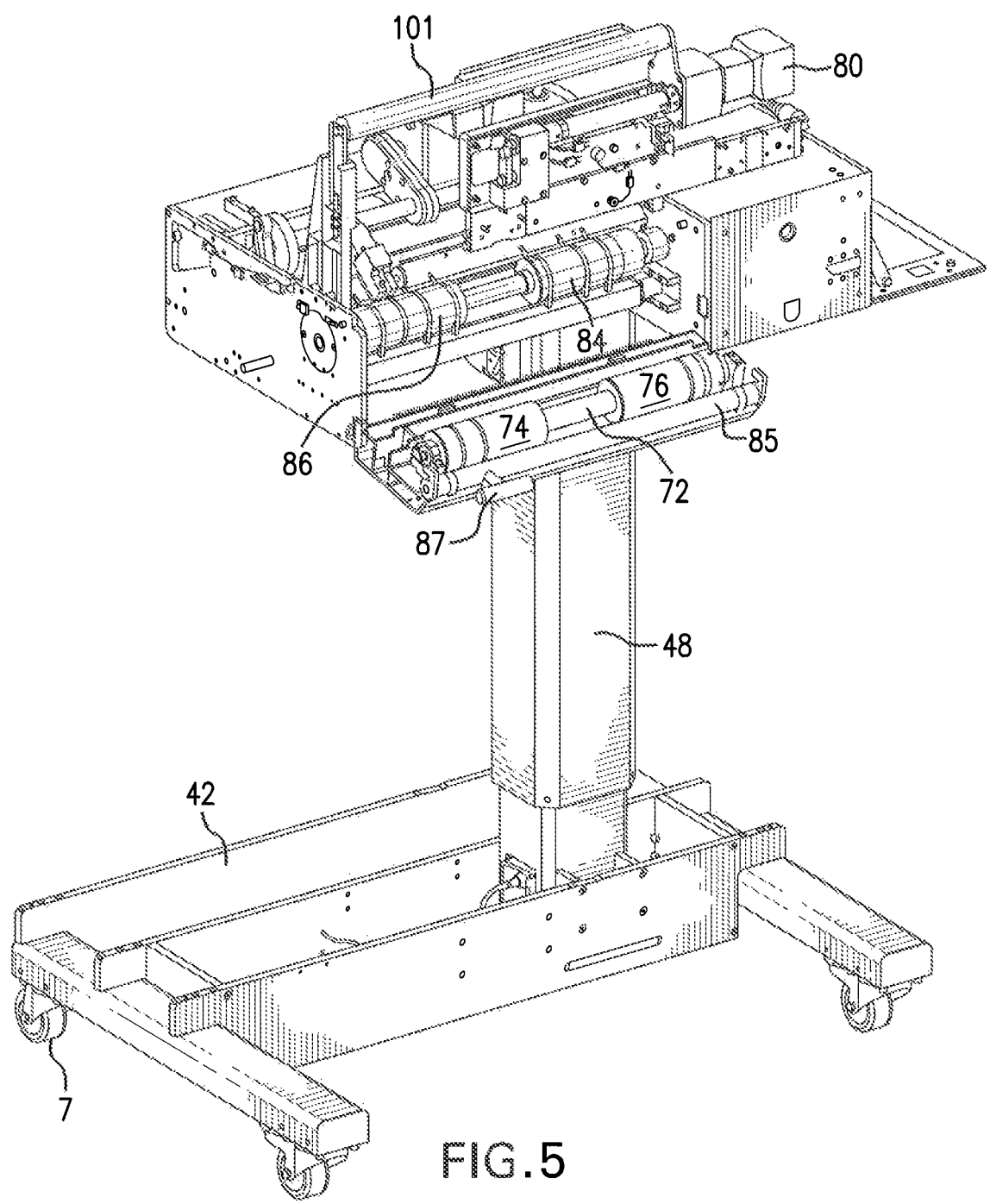
FIGS. 5-8 illustrate front perspective views of a bag forming assembly of the dispenser system of the present disclosure.
Figure 6:
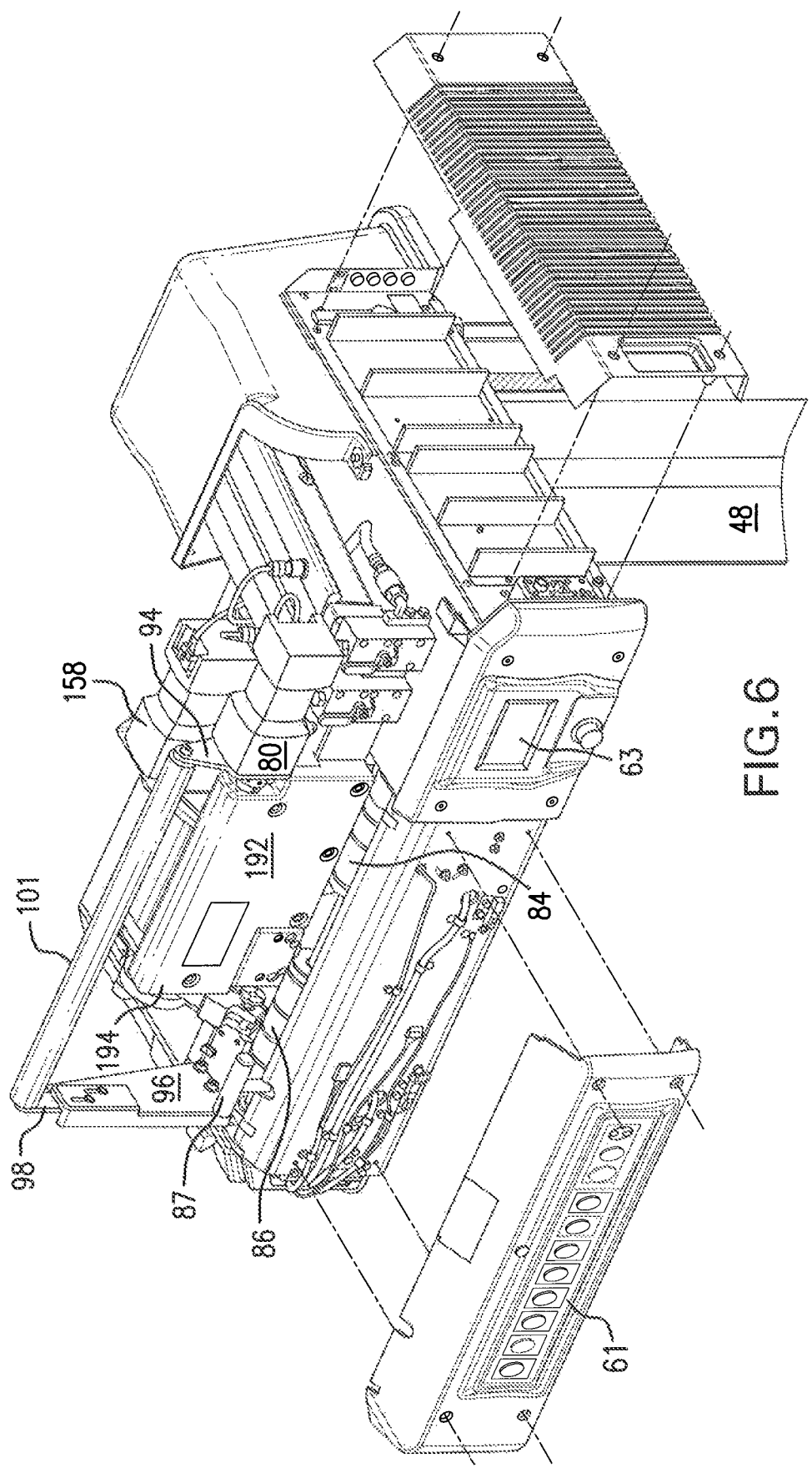

Also, FIGS. 5-8 show first (preferably being releasably lockable in an operative position) end or cross-cut/seal support block or cut/seal jaw 116 positioned forward of a vertical plane passing through the nip roller contact location and below the axis of rotation of drive shaft 82. End cut/seal jaw 116, which preferably is operationally fixed in position, in this embodiment has extruded aluminum construction (and is part of the flip door frame) of a sufficiently high strength so that it is not easily deformed over an extended length, and that is of sufficient heat resistance to withstand heat from the heated sealing and cutting elements (for example, a steel block with a zinc and/or chrome exterior plating), and preferably extends between left and right frame structures 66, and 68, but again, like driven shaft 72 and rollers 74, 76. The cut/seal jaw 116 is preferably supported on pivot frame sections 71, 73 and extends parallel with driven shaft 72. In some embodiments, the cut/seal jaw 116 may be of unitary construction with the sections 71, 73. FIG. 5 illustrates block 116 rigidly fixed at its ends to the opposing, interior sides of pivot frame sections 71, and 73 for movement therewith when latch (handle 87 of the latch is shown) is released. The sealing jaw 116 includes an actuator 161. Cut seal jaw operates with complementary jaw 116b, driven by motor 158 along track 117, to hold the film web in place during operation. In one embodiment, a crank is employed to drive the jaw 116b. In other embodiments, a solenoid or other means may be employed. Further disclosed is a vent cutter 162 for venting the bags, cutting wire 163 for cutting the bags, sealing wires 164a and 164b, and longitudinal sealing wires 169. The cutting and sealing wires are heated, with the heat transmitted by the cutting wire 163 to the film being greater than that of the sealing wires 163a, 163b. A PTFE (Teflon) film 166 can be used over the sealing wires 163a decrease the heat transmitted to the film compared to from the cutting wire 163.

Figure 8:
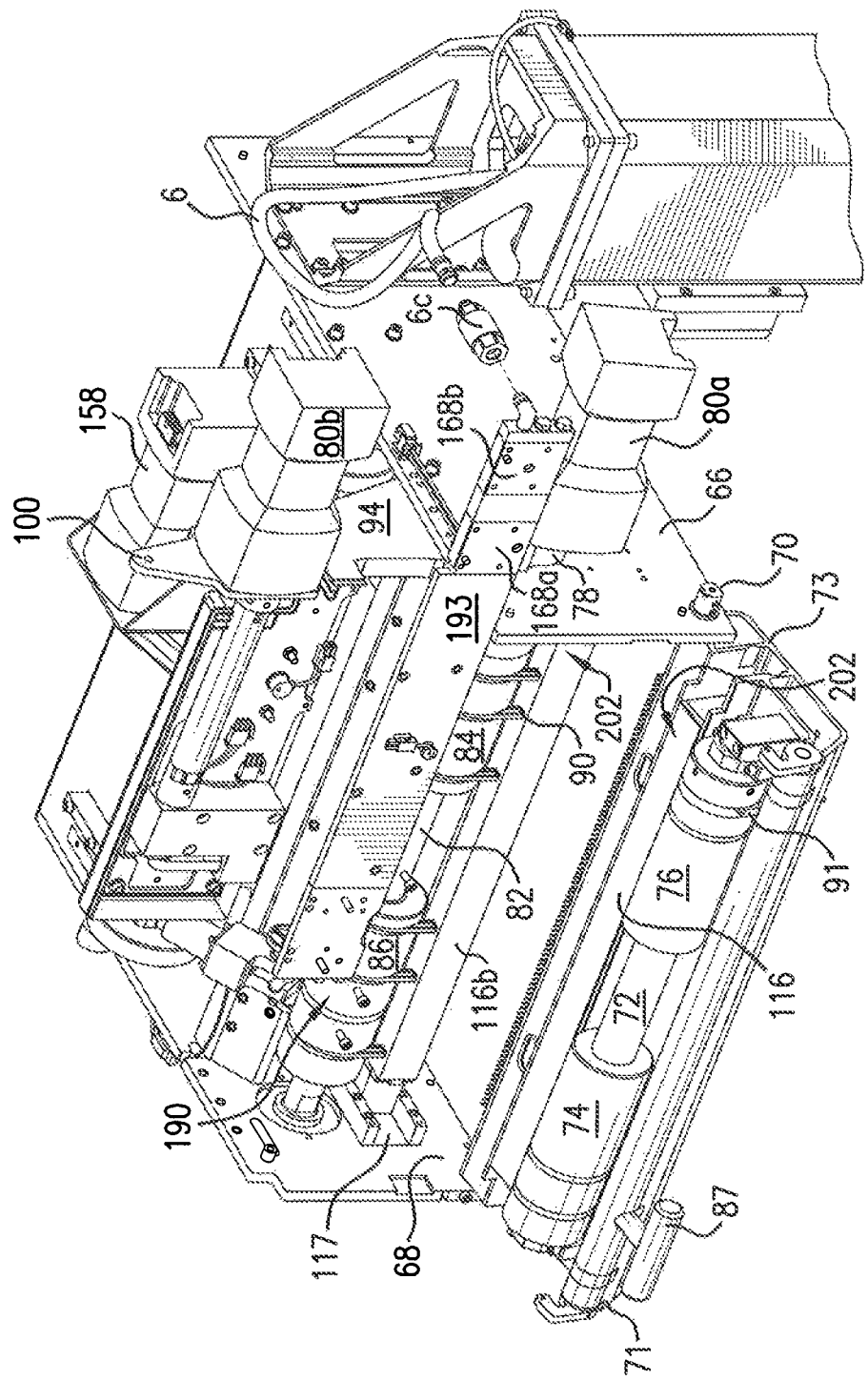
Figure 9:
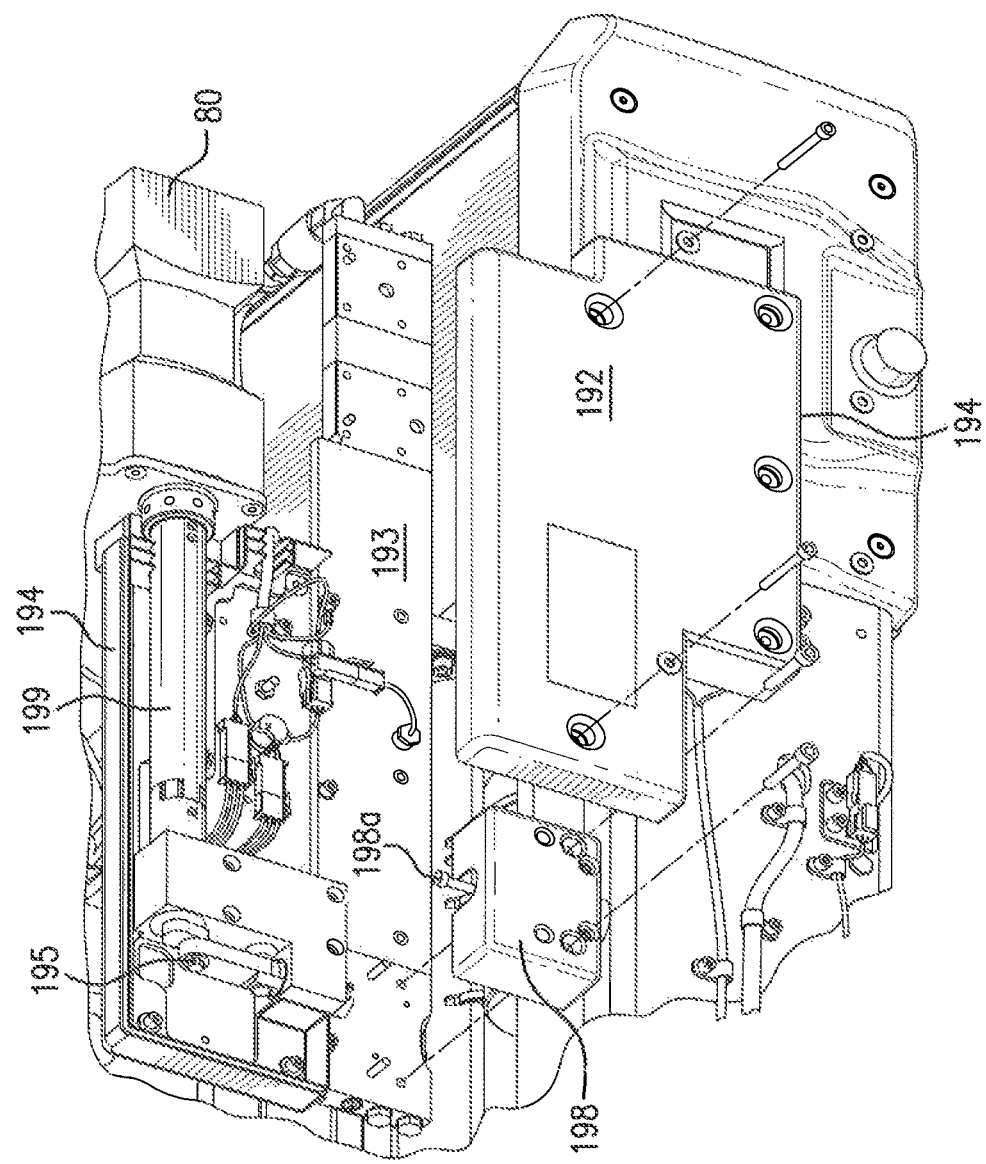
FIG. 9 illustrates a front perspective view of dispenser apparatus of the bag forming assembly.

Referring to FIG. 9, dispenser apparatus 192 includes a housing 194, motor 80b, and manifold 193. Dispenser apparatus 192 functions to dispense the foam precursor(s), such as chemicals A and B, between plies of a film web 216, and the plies are sealed together and cut to form a bag. In this manner, the dispenser apparatus 192 serves to form the foam-in-bag products as described herein. Shutoff valves 168a, 168b, for chemicals A and B, respectively, are shown in FIG. 7. A dispenser outlet preferably is also positioned above and centrally axially situated between first and second side frame structures 66, 68. With this positioning, dispensing of material (chemicals A and B) can be carried out in the clearance space defined axially between the two respective nip roller sets 74, 76 and 84, 86. Dispenser assembly 192 is preferably supported a short distance above (for example, a separation distance of about 1 to 5 inches and preferably about 2 to 3 inches) the nip contact location or the underlying (preferably horizontal) plane on which both rotation axes of shafts 72, 82 fall. This arrangement allows for receipt of chemical in the bag-being formed in direct fashion and with a lessening of spray or spillage due to a higher clearance relationship as in the prior art. Mixing module 198 mixes chemicals A and B prior to insertion into the web 216, and includes a valve stem 198a actuated by actuator 195, which itself is driven by shaft 199 and motor 80b. Solvent is delivered to the mixing module using solvent line 6a and manifold 6c (shown in FIG. 8). Manifold 6c is provided for a check valve that functions to produce sufficient back pressure in the solvent hose. The mixing module is secured by an attachment means 190 (shown in FIG. 8), which may include one or more screws and pins. The pins also serve to accurately position the mixing module 198 with respect to the actuator 195.

Figure 10:
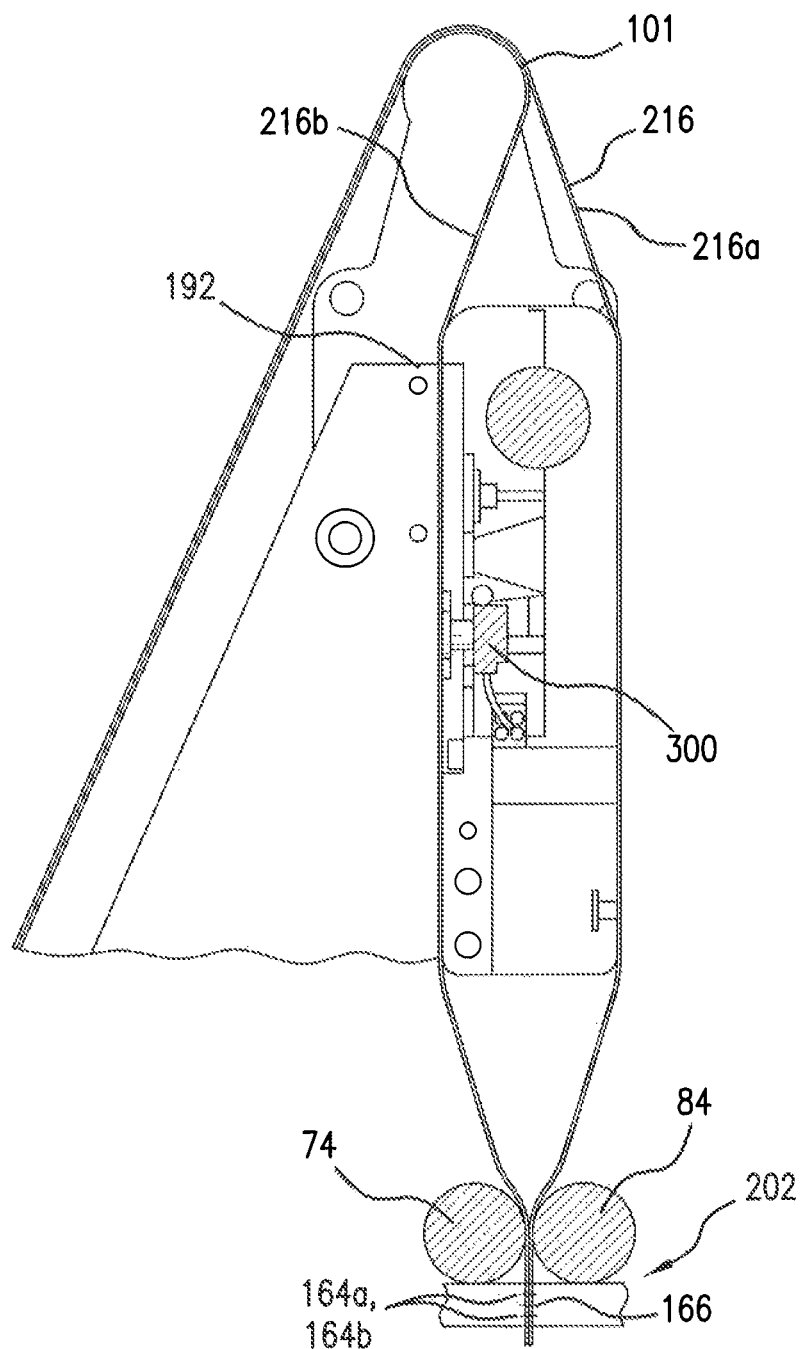
FIG. 10 illustrates a portion of a film travel path through the dispenser apparatus in accordance with the present disclosure.

FIGS. 8 and 10 provides a side elevational view of dispenser system 192 and jaw assembly 202, including jaws 116 and 116b, in relationship to film 216 which in a preferred embodiment is a C-fold film featuring a common fold edge and two free edges at the opposite end of the two fold panel. The jaw assembly is configured for driving 116b against 116 with sufficient force to pinch the two film plies to performs the sealing and cutting and to keep the precursors from leaking past the jaws before the sealing is complete. While a C-fold film is a preferred film choice, a variety of other film types of film or bag material sources are suitable for use of the present invention including gusseted and non-gusseted film, tubular film (preferably with an upstream slit formation means (not shown) for passage past the dispenser) or two separate or independent film sources (in which case an opposite film roll and film path is added together with an added side edge sealer) or a single film roll comprised of two layers with opposite free edges in a stacked and rolled relationship (also requiring a two side edge seal not needed with the preferred C-fold film usage wherein only the non-fold film edging needs to be edge sealed). For example, in a preferred embodiment, in addition to the single fold C-fold film, with planar front and back surfaces, a larger volume bag is provided with the same left to right edge film travel width (for example, 12 inch or 19 inch) and features a gusseted film such as one having a common fold edge and a V-fold provided at that fold end and on the other, interior side, free edges for both the front and rear film sheets sharing the common fold line. The interior edges each have a V-fold that is preferably less than a third of the overall width of the sheet.

As further shown in FIG. 10 after leaving the film roll and traveling past the lower idler roller, the film is wrapped around upper idler roller 101 and exits at a position where it is shown to have a vertical film departure tangent vertically aligned with the nip contact edge of the nip roller sets. Because of the C-fold arrangement, the folded edge is free to travel outward of the cantilever supported dispenser system 192. That is, depending upon film width desired, the folded end of C-fold film 216 travels vertically down to the left side of dispenser end section 196 for driving nip engagement with the contacting, left set of nip rollers. The opposite end of film 216 with free edges travels along the smooth surface of dispenser housing whereupon the free edges are brought together for driving engagement relative to contacting right nip roller set (76, 84) for the bag being formed.

Figure 11:
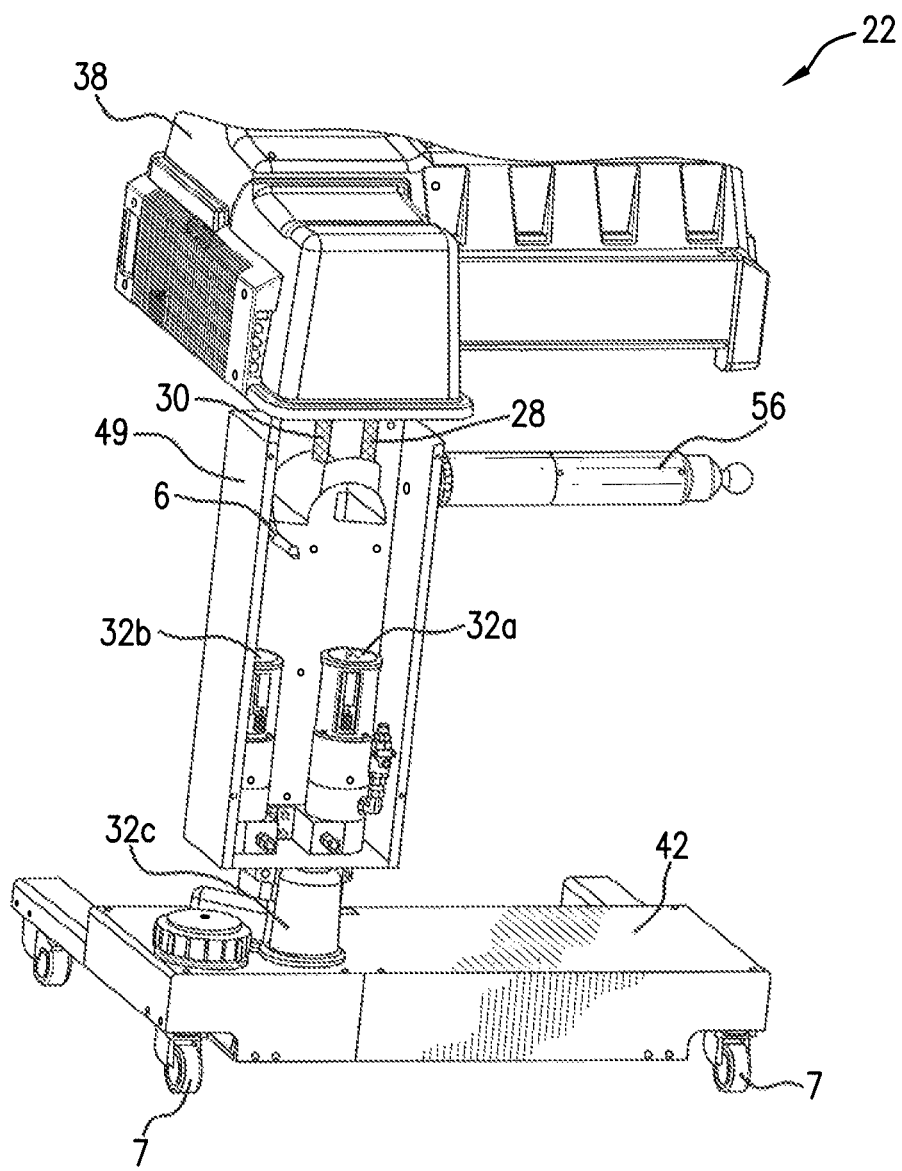
FIG. 11 illustrates a view of an inline pump assembly and hose manager in accordance with the present disclosure.

Referring to FIG. 11, an inline pump assembly can be used that includes a pump 32a for the feed line of chemical A 28, and a pump 32b for the feed line of chemical B 30. As shown, inline pumps 32a, 32b can, in some embodiments, be housed within and mounted to a hose manager 49, which helps the telescoping column 48 to operate without interfering with the chemical lines 28, 30, and solvent line 6. The hose manager 49 can be mounted to the head of the device or to the upper telescoping portion to move with the head as it is raised or lowered, or alternatively can be mounted to the base of the device or another suitable location.

In operation, a film web 216 is fed to the apparatus 22. Cut/seal jaw 116 and complementary jaw 116b close to hold the film in place as cutting and sealing occurs. Venting holes are cut by vent cutter 162, and chemicals A and B are dispensed between the plies of the film. The jaw 116b is moved to opened, and the film 216 advances by operation of motor 80a and the nip rollers. The filled bag may be removed prior to or after opening of the jaw.

Some additional examples of these foam-in-bag fabrication devices can be seen in U.S. Pat. Nos. 5,376,219; 4,854,109; 4,938,007; 5,139,151; 5,575,435; 5,679,208; and 5,727,370. A further example of a foam-in-bag device is shown in U.S. Pat. No. 7,735,685, the contents of which are herein incorporated by reference in their entirety. Furthermore, an example of a vent cutting device is disclosed in U.S. Pat. No. 7,367,171, the contents of which are herein incorporated by reference in their entirety. The disclosure herein can, in the alternative, be used with any of the foam-in-bag systems discussed above.

Figure 14:
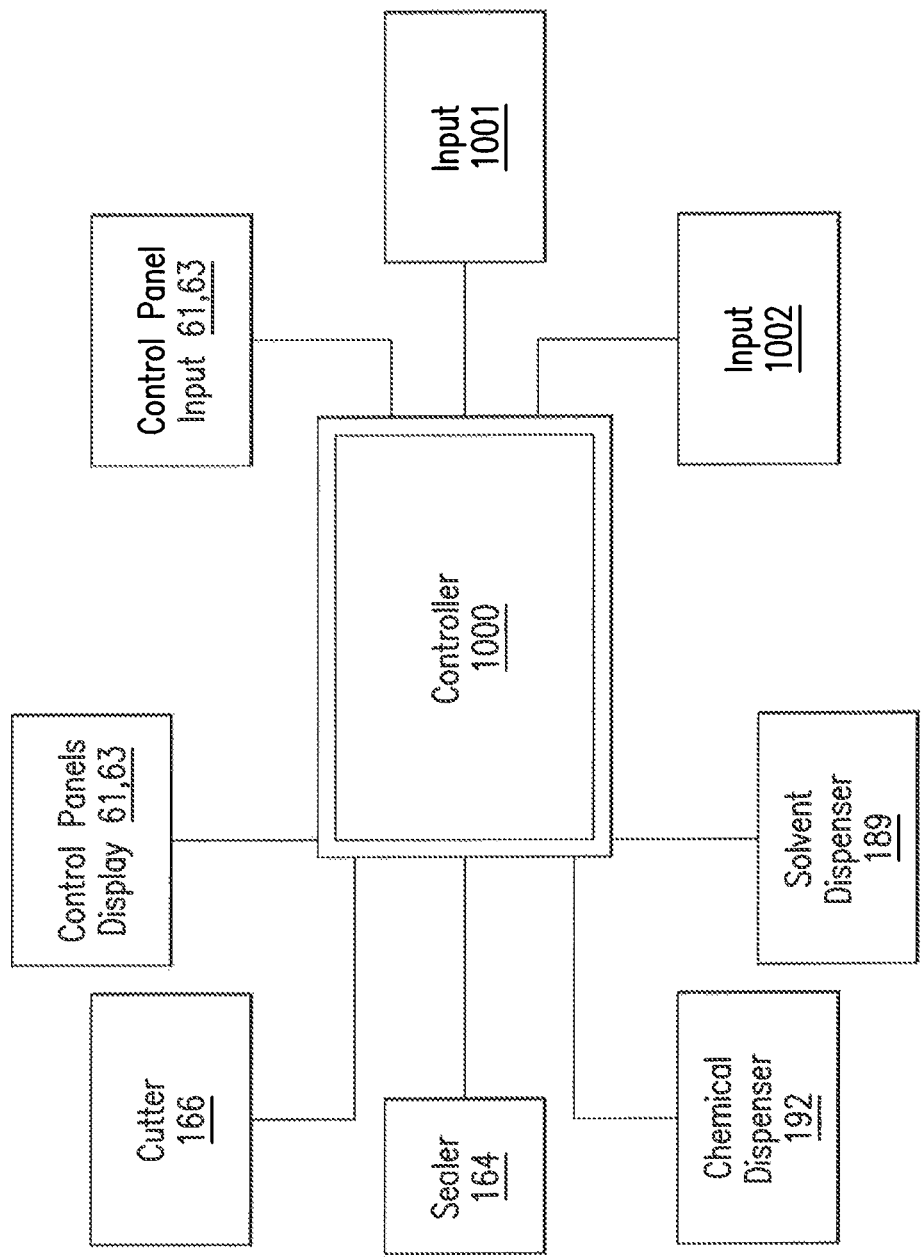
FIG. 14 illustrates a block diagram of a control system including a controller for use with the present disclosure.

With respect to any of the embodiments above, as shown in FIG. 14, a controller 1000 may be included and configured to control output to the display panels 61, 63, the cutter 166, the sealer 164, the chemical dispenser 192, or a solvent dispenser 189. Input to the controller 1000 may be from the control panels 61, 63, or from one or more inputs 1001, 1002, etc. as will be discussed in greater detail below. Controller 1000 may include, but is not limited to, a computer/processor that can include, e.g., one or more microprocessors, and use instructions stored on a computer-accessible medium (e.g., RAM, ROM, hard drive, or other storage device).

The controller 1000 may also include a computer-accessible medium (e.g., as described herein above, a storage device such as a hard disk, floppy disk, memory stick, CD-ROM, RAM, ROM, etc., or a collection thereof) can be provided (e.g., in communication with a processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes and methods, as described herein above, for example.

Further, the exemplary processing arrangement can be provided with or include an input/output arrangement, which can include, e.g., a wired network, a wireless network, the internet, an intranet, a data collection probe, a sensor, etc. The exemplary processing arrangement can be in communication with an exemplary display arrangement 61, 63, which, according to certain exemplary embodiments of the present disclosure, can be a touch-screen configured for inputting information to the processing arrangement in addition to outputting information from the processing arrangement, for example. Further, the exemplary display 61, 63 and/or a storage arrangement can be used to display and/or store data in a user-accessible format and/or user-readable format.

In one embodiment, the dispenser system 22 of the present disclosure may be provided with one or more indicators to communicate to the user whether the bag that has been filled with the foam precursors is ready to be removed from the device. Preferably, a bag-status indicator can be used to alert or otherwise notify the operator of the dispenser system 22 that a bag is ready to be removed from the dispenser, thus effectively helping to prevent the bag from inadvertently being removed too early.

The bag-status indicator may generally be provided in any manner sufficient to attract the attention of the operator, and may include, for example, an audible indicator, such as a beep or a chime, a visual indicator, such as a steady light, a flashing light, or a panel display, or a tactile indicator, such as a vibration means that the operator can feel. Other status indicators can display another characteristic or parameter relating to the bag preparation, that would indicate to the operator whether the bag is ready for removal, such as a time counted from when the sealing step has begun, the temperature of the film, or another metric that is useful for determining whether the bag sealing and cutting is complete.

Embodiments with bag-status indicators that are configured as bag-ready/not-ready indicators can communicate to the user whether the bag is ready for removal in several manners. For example, the indicator can be configured for indicating when the bag is not yet ready, or to indicate when the bag is ready. Alternatively, several indication modes may be provided by the indicator, such as one indication when the bag is not ready, and another when the bag is ready.

In a preferred embodiment, the bag-status indicator is provided as a visual indicator. Generally, such visual bag-ready indicator may be positioned anywhere on the dispenser system 22 that is visible to the operator. In a preferred embodiment, the visual bag-status indicator may be positioned on one or more of the control panels 61, 63, with reference to FIG. 2. In one embodiment, the bag-status indicator includes a steady light of any suitable color, in some embodiments a color that is distinct from other colors or display lights on in its vicinity. In another embodiment, the bag-status indicator is an intermittent light, or can have an intermittent mode and a stead mode to indicate whether the bag is not yet ready or is ready. In other embodiments, different colors can be used to indicate a not-ready or a ready state.

As discussed above, the bag-status indicator should provide its indication that a bag is ready upon the completion of a bag filling, sealing, and cutting cycle, thus effectively preventing the bag from being removed too early. As such, the bag-status indicator may be operatively connected with the cutting and sealing means of the dispenser system 22, for example, cutter jaw 118 and bag film edge sealer 91 as shown in FIGS. 5, 7. As discussed above with regard to FIG. 14, the controller 1000 may provide such connection via inputs 1001, 1002, respectively. In certain embodiments, the jaws continue to hold the bag, pinched therebetween, even once the cutting operation is complete, so it may not otherwise n\be obvious when the sealing and cutting is complete. Such operative connection may include an electrical connection with a sensor that indicates when the cutting and sealing means have finished their operation. In this respect, the disclosure is not limited to any particular connection or sensor to provide a signal to the bag-ready indicator that a bag is ready to be removed.

Figure 12A:
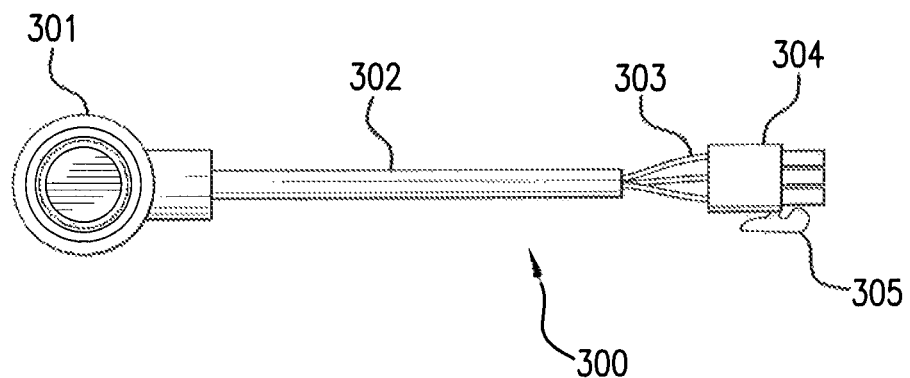
FIGS. 12a and 12b illustrate one embodiment of a bag-ready indicator in accordance with the present disclosure.
Figure 12B:
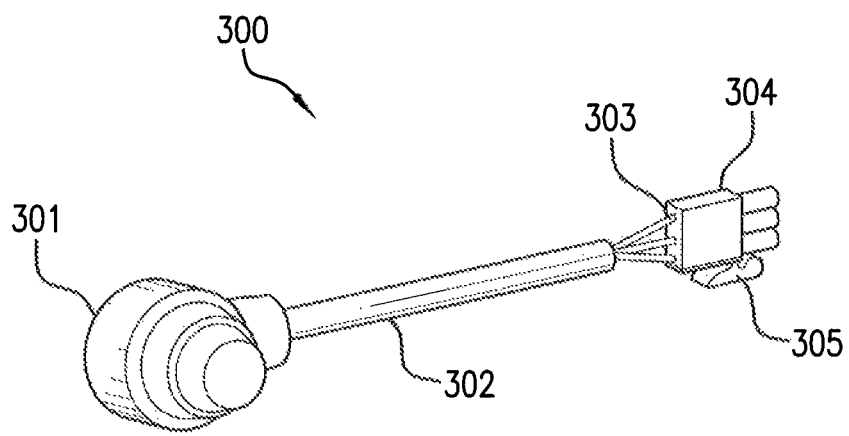

With reference now to FIGS. 12a and 12b, one embodiment of a suitable bag-ready indicator is disclosed. The bag-ready indicator 300 shown therein is a visual indicator including a light 301, one or more wires 303 (which may be covered by a protective cover 302) to provide electrical power to the light 301, an electrical connector 304 to connect the wires 303 to the rest of the dispenser system 22, and a latching means 305 to hold the connector 304 securely in place. In operation, an electrical signal is sent, from a sensor at one or more of the bag cutting and sealing means (as described above) at the appropriate time, to the electrical connector 304, at which point such signal passes through the wires 303 to illuminate the light 301 of the bag-ready indicator 300.

Figure 13B:
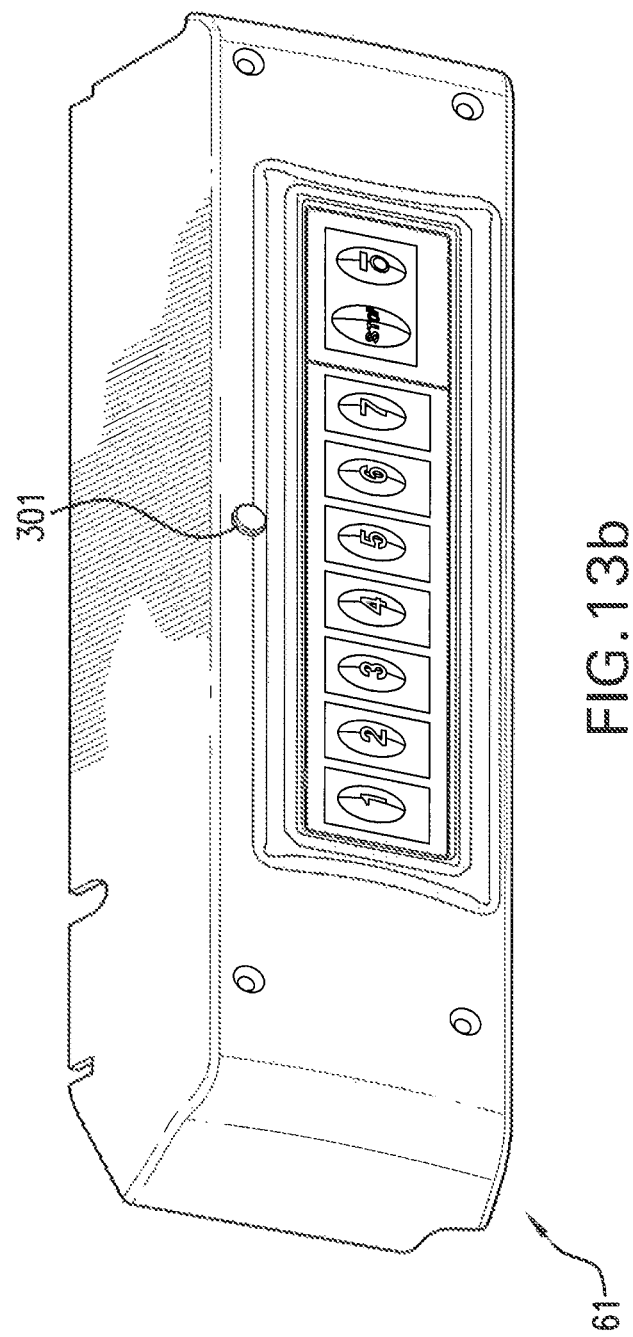

With reference now to FIGS. 13a and 13b, the bag-ready indicator 300 is shown as it would be mounted, in one embodiment, to the first control panel 61 (FIG. 13b showing a front side thereof, FIG. 13a showing a rear side thereof). On the front side, as shown in FIG. 13b, the light 301 is visible from the exterior side of panel 61. On the rear side, the mounting means for the indicator 300 to the panel 61 is shown. In one embodiment, mounting includes a mounting plate 310 affixed by screws 311 to the rear side of the panel 61 through a cylindrical post 312 including complementary threads on the inner circumference thereof. The light 301 may be received through a circular aperture of the panel 61, thereby allowing it to protrude to the front side thereof as shown in FIG. 13b.

In operation of this embodiment, once a bag is ready to be removed, the light 301 will illuminate (either continuously or intermittently), thereby notifying the operator that the bag is ready to be removed. With its preferred positioning on the control panel 61, the light will be easily visible to the operator, thereby increasing the likelihood that the operator will notice it, and remove the bag in a timely manner.

The terms "substantially" or "generally" as used herein to refer to a shape is intended to include variations from the true shape that do not affect the overall function of the device. The term "about," as used herein, should generally be understood to refer to both numbers in a range of numerals. Moreover, all numerical ranges herein should be understood to include each whole integer within the range. The terms "front," "back," "upper," "lower," "side" and/or other terms indicative of direction are used herein for convenience and to depict relational positions and/or directions between the parts of the embodiments. It will be appreciated that certain embodiments, or portions thereof, can also be oriented in other positions.

While illustrative embodiments are disclosed herein, it will be appreciated that numerous modifications and other embodiments can be devised by those of ordinary skill in the art. Features of the embodiments described herein can be combined, separated, interchanged, and/or rearranged to generate other embodiments. Therefore, it will be understood that the appended claims are intended to cover all such modifications and embodiments that come within the spirit and scope of the present disclosure.

What is claimed is:

1. A foam-in-bag dispensing system, comprising:
   a dispensing apparatus operative to dispense foam precursor, the foam precursor being configured for expanding and solidifying into a polymeric foam, to a dispensing location between first and second web plies;
   an assembly that includes:
     a sealing mechanism that performs a sealing operation to form a seal that seals the web plies to each other, thereby trapping the foam precursor therebetween to form a filled bag;
     a cutting mechanism co-located with the sealing mechanism, wherein the cutting mechanism performs a cutting operation to cut the filled bag from an adjacent bag; and
     a jaw assembly configured to pinch the web plies during the sealing operation and the cutting operation, the filled bag being removable from the foam-in dispensing system by an operator pulling the filled bag from the jaw assembly; and
   a bag-status indicator having a plurality of indication modes including a bag-ready mode, wherein the bag-status indicator is connected to the assembly to receive a signal to cause the bag-status indicator to change to the bag-ready mode upon sufficient completion of the sealing and cutting operations, wherein the sufficient completion is when the filled bag can be pulled apart from the adjacent bag without pulling the adjacent bag in a manner that compromises the seal, thereby providing an indication to an operator that the filled bag is ready for removal from the jaw assembly without compromising the seal for avoiding premature bag removal, and
   wherein the jaw assembly continues to pinch the filled bag after the bag-status indicator changes to the bag-ready mode.

2. The foam-in-bag dispensing system of claim 1, wherein the indicator changes to the bag-ready mode when the bag is in a removable location so that a user can grasp the bag and remove the bag from the assembly.

3. The foam-in-bag dispensing system of claim 1, wherein the sealing mechanism includes first and second sealing elements disposed on opposite sides of a cutting element of the cutting mechanism.

4. The foam-in-bag dispensing system of claim 3, wherein the first and second sealing elements comprise first and second sealing wires, respectively, and wherein the cutting element comprises a cutting wire disposed between the sealing wires, the cutting wire and the first and second sealing wires operatively associated with a pair of opposing jaws in the jaw assembly configured to hold the first and second web plies during the sealing and cutting operations.

5. The foam-in-bag dispensing system of claim 4, wherein one of the opposing jaws is mounted to a first frame portion movable with respect to a second frame portion supporting the other one of the pair of jaws to allow the pair of jaws to be spaced apart from one another for loading a supply of film material on the dispensing apparatus.

6. The foam-in-bag dispensing system of claim 1, wherein:
   the sealing mechanism performs the sealing operation such that the seal comprises a seal on each of the filled bag and the adjacent bag; and
   the cutting mechanism cuts between the seals on each of the filled bag and the adjacent bag.

7. A foam-in-bag dispensing device for creating one or more bags comprising:
   a controller for controlling select operations of the foam-in-bag dispensing device;
   a cutter that performs a cutting operation to make a cut on the one or more bags;
   a sealer that performs a sealing operation to form a seal on either side of the cut on the one or more bags, the cutter and the sealer being in electrical communication with the controller;
   a pair of opposing jaws configured to hold a bag of the one or more bags during the sealing operation and the cutting operation, the bag being removable from the foam-in dispensing device by an operator pulling the bag from the pair of opposing jaws; and a bag-status indicator in electrical communication with the controller, the bag-status indicator having a plurality of indication modes including a bag-ready mode, wherein the controller is configured to transmit a signal to the bag status indicator to cause the bag status indicator to change to the bag-ready mode upon sufficient completion of both the cutting operation and the sealing operation, wherein the sufficient completion is when the bag can be pulled apart from an adjacent bag without pulling the adjacent bag in a manner that compromises one or both of the seals, thereby providing indication to an operator that the bag is ready for removal from the pair of opposing jaws without compromising one or both of the seals for avoiding premature bag removal, and wherein the pair of opposing jaws continue to pinch the bag after the bag-status indicator changes to the bag-ready mode.

8. The foam-in-bag dispensing device of claim 7, wherein the controller determines that at least one of the cutting operation or sealing operation is sufficiently complete based on a time counted from when the sealing operation has begun.

9. The foam-in-bag dispensing device of claim 7, wherein the indicator changes to the bag-ready mode when the bag is in a removable location so that a user can grasp the bag and remove the bag from the dispensing device.

10. The foam-in-bag dispensing device of claim 7, wherein the controller determines that at least one of the cutting operation or sealing operation is sufficiently complete based on a temperature of the bag.

11. A foam-in-bag dispensing system, comprising:

a dispensing apparatus operative to dispense foam precursor, the foam precursor being configured for expanding and solidifying into a polymeric foam, to a dispensing location between front and back web plies;

a sealing mechanism that performs a sealing operation to form a seal that seals the web plies to each other to trap the foam precursor therebetween to form a filled bag;

a cutting mechanism that performs a cutting operation;

a holding assembly that holds the filled bag by pinching the front and back web plies during the sealing and cutting operations and after the sealing and cutting operations are complete, the filled bag being removable from the dispensing system by an operator pulling the filled bag from the holding assembly; and a bag-status indicator having a plurality of indication modes including a bag-ready mode, the bag-status indicator being connected with the sealing and cutting mechanisms such that the bag-status indicator changes to the bag-ready mode upon sufficient completion of the sealing and cutting operations, wherein the sufficient completion is when the filled bag can be pulled apart from an adjacent bag without pulling the adjacent bag in a manner that compromises the seal, thereby providing an indication to the operator that the filled bag is ready for removal from the dispensing system without compromising the seal for avoiding premature bag removal, and wherein the holding assembly continues to hold the filled bag after the bag-status indicator changes to the bag-ready mode.

12. The dispensing system of claim 11, wherein the plurality of indication modes includes a bag-not-ready mode.

13. The dispensing system of claim 11, further comprising a controller that is operably connected to the indicator and the dispensing apparatus, wherein the controller is configured to send a signal to the indicator indicative of the readiness of the bag for removal.

14. The dispensing system of claim 13, wherein the controller sends the signal to the indicator when the bag is ready to be removed.

15. The dispensing system of claim 13, wherein the controller sends the signal to the indicator when the bag is not yet ready to be removed.

16. The dispensing system of claim 11, wherein the bag-status indicator includes a visual indicator.

17. The dispensing system of claim 16, wherein the visual indicator includes a light.

18. The dispensing system of claim 16, wherein the visual bag-ready indicator is positioned on a control panel of the dispensing system.

19. The dispensing system of claim 11, wherein the bag-status indicator includes an audible indicator.

20. The foam-in-bag dispensing system of claim 11, wherein the holding assembly pinches a region of the web plies that form the filled bag.

21. The foam-in-bag dispensing system of claim 20, wherein the sealing mechanism is disposed to perform the sealing operation in said region.

22. The foam-in-bag dispensing system of claim 20, wherein the holding assembly comprises jaws that hold the filled bag by pinching the front and back web plies.

23. The foam-in-bag dispensing system of claim 22, wherein the jaws of the holding assembly continue to pinch the bag after the bag-status indicator changes to the bag-ready mode until operator removes the filled bag.

24. The foam-in-bag dispensing system of claim 11, wherein the holding assembly comprises at least one of the cutting mechanism or sealing mechanism.

25. The foam-in-bag dispensing system of claim 24, wherein the sealing mechanism performs the sealing operation by heat sealing the web plies to form the seal.

26. The foam-in-bag dispensing system of claim 24, wherein the cutting mechanism performs the cutting operation by heat cutting the web plies.

27. The foam-in-bag dispensing system of claim 24, wherein:

the sealing mechanism performs the sealing operation by heat sealing the web plies to form the seal; and the cutting mechanism performs the cutting operation by heat cutting the web plies.

28. The foam-in-bag dispensing system of claim 11, wherein the holding assembly holds the filled bag after the bag-status indicator changes to the bag-ready mode at an exit from the dispensing system so that a portion of the filled bag is exposed for access by an operator to grip the portion of the filled bag to pull the filled bag from the holding assembly.

29. The foam-in-bag dispensing system of claim 28, wherein the holding assembly holds the filled bag with the exposed portion of the filled bag hanging therefrom for said access by the operator.

30. The foam-in-bag dispensing system of claim 11, wherein the holding assembly comprises jaws which hold the web plies during the sealing and cutting operations.

* * * * *

UNITED STATES PATENT AND TRADEMARK OFFICE
CERTIFICATE OF CORRECTION

PATENT NO. : 10,864,664 B2
APPLICATION NO. : 13/223086
DATED : December 15, 2020
INVENTOR(S) : Jones It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 892 days.

Signed and Sealed this
Sixth Day of December, 2022

Katherine Kelly Vidal
*Director of the United States Patent and Trademark Office*